United States Patent [19]

Sugibuchi et al.

[11] 4,220,705
[45] Sep. 2, 1980

[54] PROCESS FOR MANUFACTURING A MULTI-COLORED DISPLAY POLARIZER

[75] Inventors: Shigeyoshi Sugibuchi, Tokyo; Mitsuo Hiramatsu, Fujimi; Takeo Aizawa, Sano, all of Japan

[73] Assignee: Sanritsu Denki Kabushikikaisha, Tokyo, Japan

[21] Appl. No.: 941,686

[22] Filed: Sep. 12, 1978

[30] Foreign Application Priority Data

Jul. 26, 1978 [JP] Japan ................... 53/93558

[51] Int. Cl.² .............................................. G03C 5/00
[52] U.S. Cl. ........................................ 430/294; 430/7; 430/321
[58] Field of Search ............... 96/36, 36.4, 38.3, 118

[56] References Cited

U.S. PATENT DOCUMENTS

| 2,959,483 | 11/1960 | Kaplan | 96/118 |
| 3,833,374 | 9/1974 | Patrick | 96/36 |
| 3,839,039 | 10/1974 | Suzuki et al. | 96/36 |
| 4,082,549 | 4/1978 | Hass et al. | 96/36 |

FOREIGN PATENT DOCUMENTS 53-55138 5/1978 Japan .

Primary Examiner—Jack P. Brammer
Attorney, Agent, or Firm—Shlesinger, Arkwright, Garvey & Dinsmore

[57] ABSTRACT

A multi-colored display polarizer is manufactured by supporting on a transparent substrate a multi-colored polarizing film which is produced by a required number of repetitions, each using a coloring means producing a different color, a sequence of operations comprising coating a photosensitive resin onto the surface of a polarizing film blank and drying the same, exposing the coated film through a photographic negative having a desired pattern thereon to photo-set a portion of the film corresponding to the transparent portion of the negative, developing the thus exposed film, coloring the thus developed film with a suitable coloring means, and removing the photosensitive resin remaining on said photoset portion of the film.

15 Claims, 12 Drawing Figures

FIG. I(A)
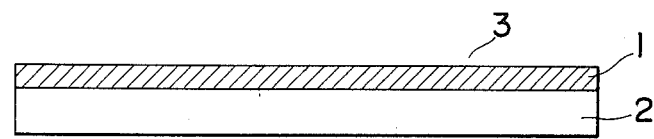
FIG. I(B)

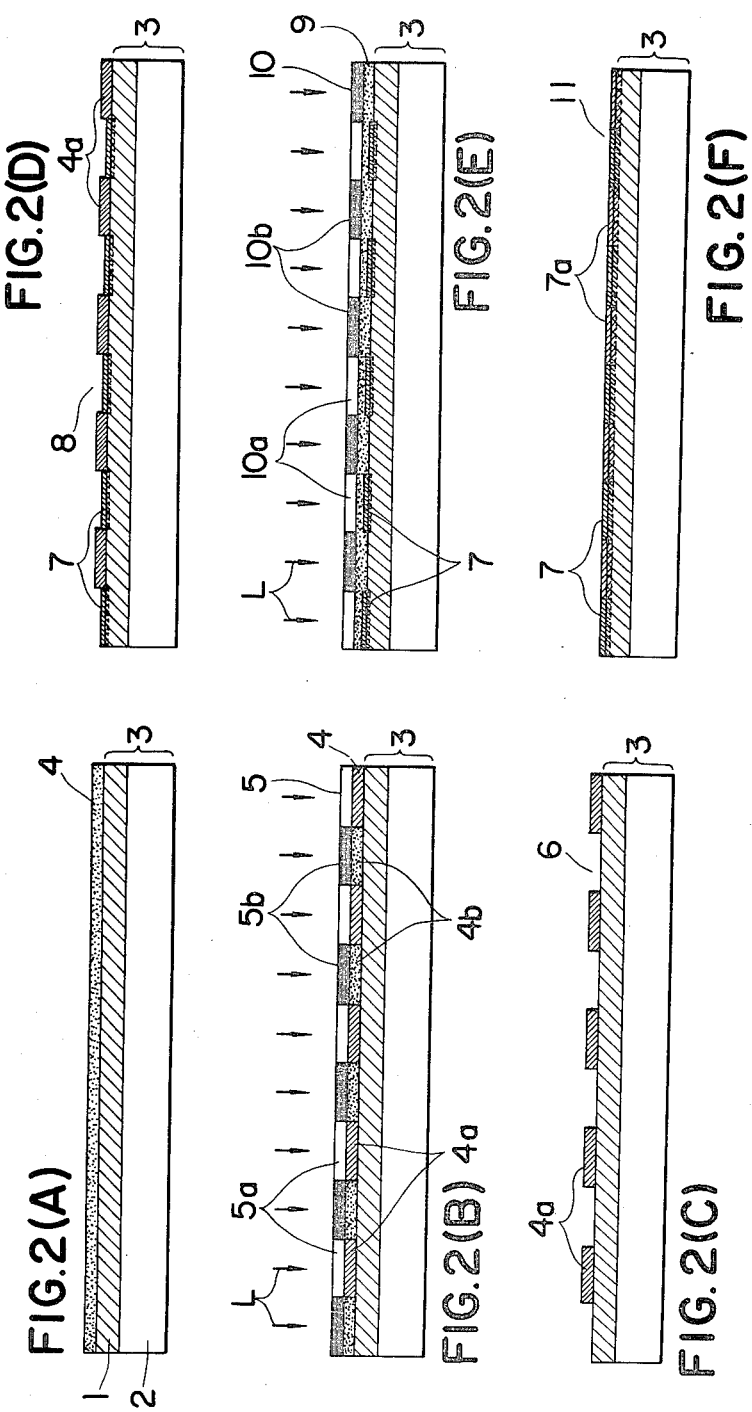

PROCESS FOR MANUFACTURING A MULTI-COLORED DISPLAY POLARIZER

BACKGROUND OF THE INVENTION

The present invention relates to a process for manufacturing a multi-colored display polarizer which is suitably applicable, for example, to a liquid crystal display unit.

In general, to manufacture a polarizer, a blank of polymeric material such as polyvinyl alcohol, cellophane or the like on which iodine, dyestuff and so on is adsorbed is first oriented in one direction to form a polarizing film and, then, a transparent substrate of cellulosic resin, acrylic resin, film, glass or the like material is applied onto one or both sides of the resultant polarizing film so that the polarizing film can retain a stable polarizability.

A wide variety of liquid crystal display units have been proposed so far, in which a polarizer formed in the aforementioned manner is positioned on the topside and underside of an electrode cell hermetically filled with a liquid crystal in such a manner that the axes of polarization of two polarizers are normal to each other for permitting desired patterns such as alphamerics to be displayed depending upon an application of voltage to the electrode cell.

However, in such prior art polarizers, since the polarizer itself has optically uniform and homogeneous characteristics over its entirety, the display comprises a monochromatic pattern based on a difference in brightness only, except for those cases in which one of the polarizers has different optical characteristics by being treated with a coloring or other processing. Therefore, even if such a prior art polarizers are used in display panels of measuring instruments such as flow meters, level meters and so on, the display obtained thereby is monotonous without a change in color and may often be erroneously read or overlooked. Further, the prior art polarizers are also unsatisfactory in that only a limited variation is allowed in designing and, therefore, are not suited for educational toys that particularly require colorful changes.

To overcome such shortcomings of the conventional polarizers, an application of polarizing films consisting of narrow film strips with different colors onto the aforesaid transparent substrate in an optical manner or a transfer of printing of a polarizing ink consisting of iodine, dyestuff and so forth onto the aforesaid blank of polymeric material such as polyvinyl alcohol has been proposed. However, in the first method cited immediately above, it is not only difficult to apply the polarizing films to the transparent substrate without leaving a gap between any two adjacent polarizing films, but also to obtain polarizers of a stable quality because the polarizing films tend to exfoliated from the transparent substrate as time elapses. While, in the latter method cited above, it is also difficult to ensure a sharp separation of color zones, because two adjacent colored polarizing strips overlap with each other or are spaced apart by a small gap from each other at the boundary thereof due to blotting of the polarizing ink or depending upon the skills of transfer technique used.

The present invention has been achieved to overcome the aforementioned shortcomings of the polarizers according to the prior art.

SUMMARY OF THE INVENTION

An object of the present invention is to provide a process for manufacturing in a simplified manner a multi-colored display polarizer which has a sharp colar separation without overlaps or gaps at the boundaries of any two adjacent colored polarizing strips thereof each having a different color.

Another object of the present invention is to provide a process for manufacturing a multi-colored display polarizer which can maintain a stable polarizability over a substantial period of time without a possibility of successively disposed colored polarizing strips with different colors being oxfoliated from the transparent substrate thereof due to aging.

A further object of the present invention is to provide such a process for manufacturing a multi-colored display polarizer that can form desired patterns such as letters, figures, symbols and so forth on one single transparent substrate in desired colors.

That is to say, the present invention provides, in the manufacture of a polarizer composed of a polarizing film and a transparent substrate for supporting the same, a process for manufacturing a multi-colored display polarizer, comprising coating a photosensitive resin onto the surface of a polarizing film bank and drying the same, exposing the thus coated film through a photographic negative to photo-set the photosensitive resin at that portion of said coated film corresponding to the transparent portion of said photographic negative, developing the thus exposed film by dissolving and removing the resin remaining on the unexposed portion of said coated film to disclose the original transparent polarizing film blank thereunder, coloring only the thus disclosed transparent polarizing film blank portion with a polarizing ink composed of iodine, dyestuff and so forth to form a colored polarizing film, followed by a removal of the resin on said photo-set portion of said coated film, and repeating, each time by using a polarizing ink producing a different color, the foregoing sequence of operations for a required number of times for forming on said polarizing film blank a desired multi-colored pattern such as a striped pattern, figure, symbol or the like.

The photosensitive resin (hereinafter referred to as photo-resist) applicable to the process according to the present invention has a liquid state under normal conditions and includes water-soluble resins such as dichromate type photo-resists obtained by blending a dichromate with isinglass, casein, polyvinyl alcohol (PVA), etc., acrylic photo-resists obtained by copolymerizing a vinyl monomer with methyl methacrylate, etc. and so forth; and oil-soluble resins such as polyvinyl cinnamate type photo resists obtained by blending a polyvinyl cinnamate with various photosensitizers, cyclized rubber-azide type photo-resists obtained by blending a cyclized natural or synthetic rubber with an aromatic bisazide compound such as 2,6-di-(4'-azidebenzal)-cyclohexanone, etc. and so forth. The foregoing are so-called negative type photo-resists. Besides these, an oil-soluble o-naphthoquinone diazide type photo-resist which produces a water-soluble cyclopentacarboxylic acid by being irradiated by light may be used.

Any of the aforementioned photo-resists is coated onto a polarizing film blank and the thus coated film is dried to form thereon a photosensitive layer of about $10 \sim 50\mu$ thick. Then a photographic negative having a desired pattern is placed thereon and the photosensitive layer of the film covered with said negative is irradiated by light. In this manner, a photo-set portion and a non-set portion are produced on the photosensitive layer correspongingly to said pattern of the photographic negative.

Thereafter, the aforesaid non-set portion of the photo-sensitive layer is washed off therefrom with water or a suitable organic solvent to disclose the original polarizing film blank, while said photo-set portion is left on the film as an insolubilized gelcoat. That is so say, said irradiated film is developed. In this case, a suitable developer is selected depending on the particular photo-resist used. For example, water is suitable for dichromate type photo-resists, xylene or trichloroethylene or the like for polyvinyl cinnamate type photo-resists, and aromatic hydrocarbons such as toluene, xylene, etc. for cyclized rubber-azide type photo-resists, respectively.

That portion of the polarizing film blank dissolved by the development is colored in a desired color by being immersed in a polarizing ink (solution) composed of iodine, dyestuff and other components.

The dyestuff for said coloring processing may be any well-known dyestuff, such as acid dye and direct dye, having a sufficient coloring power to the film blank such as polyvinyl alcohol (PVA) but without an affinity for said photo-set portion of the photosensitive layer of the film. For example, those dyestuffs listed immediately below can be advantageously used for executing the present invention:

| Trade name | Color code index |
| --- | --- |
| Acid Dye; | |
| Naphthol Yellow-S | 10316 |
| Kayaku Acid Light Yellow 2G | 18965 |
| Suminol Fast Red-B | 14680 |
| Solar Red RB | 14895 |
| Suminol Black 8BX | 26370 |
| Sumilan Black WA | 15711 |
| Aizen Violet 3RH | 16055 |
| Solar Pure Blue VX | 42051 |
| Suminol Blue BL | 50315 |
| Sumitomo Light Green SF Yellowish | 42095 |
| Direct Dye; | |
| Kayaku Direct Brilliant Yellow G | 24890 |
| Kayarus Yellow GC | 29000 |
| Kayaku Congo Red | 22120 |
| Aizen Direct Violet LNH | 22480 |
| Kayaku Direct Copper Blue 2B | 24185 |
| Kayarus Cupro Green G | 34040 |
| Kayaku Direct Fast Black D | 27700 |

On the polarizing film blank which is partially colored with the polarizing ink as mentioned above, there also remains some of the said photo-set portion as an insolubilized gelcoat. This photo-set portion of the photosensitive resin is washed off with a suitable solvent to disclose the original polarizing film blank thereunder. Thus, a polarizing film which is partially colored at that portion thereof corresponding to the transparent portion of the photographic negative is produced.

The solvent used for washing off the aforesaid photo-set portion of the photosensitive resin must be of such a type that does not affect said colored portion of the polarizing film in any manner and, for example, a dilute aqueous alkali solution may be used for the aforementioned acrylic photo-resists, monochlorobenzene for polyvinyl cinnamate type photo-resists, and trichloroethylene or perchloroethylene for cyclized rubber-azide type photo-resists, respectively.

BRIEF DESCRIPTION OF THE DRAWINGS

Hereinafter, the present invention will be described further in detail by way of the preferred embodiment thereof with reference to the accompanying drawing, in which:

FIG. 1A is a section of a film blank used for manufacturing the multi-colored polarizers according to the present invention and FIG. 1B is a section of said film blank shown in FIG. 1A as being stuck onto a transparent substrate;

FIGS. 2A through 2F are sections showing the in-process states of the polarizer according to the present invention for illustrating the sequential steps of the process according to the present invention.

DETAILED DESCRIPTION OF THE PREFERRED EMBODIMENTS OF THE INVENTION

Figure 3A:
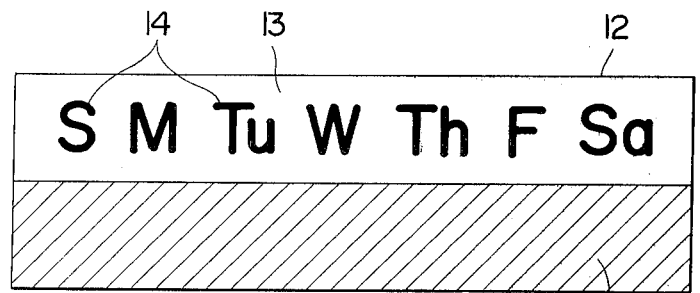
FIGS. 3A through 3C are schematic plan views for illustrating another preferred embodiment of the process according to the present invention.

Referring now to the drawings, especially, to FIG. 1 showing a film blank used for manufacturing the multi-colored display polarizer according to the present invention, the reference numeral 1 indicates the polarizing film blank which is obtained by orienting a polymeric material such as polyvinyl alcohol (PVA) in one direction and fixating by drying the thus oriented material (FIG. 1A). 3 is a laminate obtained by optically applying and fixing the aforesaid polarizing film blank 1 onto a transparent substrate 2 of a cellulosic resin, acrylic resin or the like material. The transparent substrate 2 may be pre-colored.

Referring now to FIG. 2 illustrating in sequence the various steps of the process for manufacturing the multi-colored display polarizer according to the present invention, a photo-resist liquid is first coated onto the surface of said polarizing film blank 1 of the laminate 3 and dried to form thereon a photosensitive layer 4 of colloidal cost (FIG. 2A).

Then, a photographic negative 5 is placed on said photosensitive layer 4 in close contact therewith and exposed to the light L. On said photographic negative 5, transparent portion 5a of strip shape and opaque portions of 5b of the like strip shape, namely, white and black stripes are alternately disposed so as to form a grating pattern. For the exposure to light L, a light emitted by a high-pressure mercury vapor lamp, carbon arc lamp, xenon lamp or the like source is used for 30 seconds to 3 minutes to irradiate said photosensitive layer 4.

As a result of said exposure, the photosensitive layer 4 has its portions corresponding to the transparent portions 5a of the photographic negative 5 only photo-set, so that set portions 4a and non-set portions 4b are formed in said photosensitive layer 4 (FIG. 2B).

Thereafter, the thus laminate 3 having said photosensitive layer 4 is developed by dissolving and removing said non-set portions 4b of the photosensitive layer 4 with water or a suitable organic solvent to disclose the original polarizing film blank 1. Thus, a positive plate 6 on which said photo-set portions 4a are left as an insolubilized gelcoat is obtained (FIG. 2C).

Thereafter, said positive plate 6 is immersed in a polarizing ink (solution) composed of iodine, dyestuff and so on which colors only said disclosed polarizing film blank 1 without coloring said photo-set portion 4a of the photosensitive layer 4. Thus, a polarizer 8 can be produced, in which colored polarizing film portions 7a are formed so as to present as a whole a monochromatic grating pattern corresponding to the opaque portions 5b of the photographic negative 5 (FIG. 2D).

Then, the resin at said set portion 4a of the polarizer 8 is removed to disclose the original transparent polarizing film blank 1 thereunder by using a suitable solvent which does not act to release the colored polarizing films 7 from the polymerizing film blank 1, and the photo-resist liquid is coated again on the entire surface of the topside of the polarizer 8 and dried to form another photosensitive layer 9.

Subsequently thereto, another photographic negative 10 having transparent portions 10a and opaque portions 10b which are disposed exactly oppositely to the transparent portions 5a and opaque portions 5b, respectively, of the first-cited photographic negative 5, is placed on said photosensitive layer 9 in close contact therewith, and exposition and development steps are repeated in the same manner as described previously.

As a result of these steps, only those portions of the photosensitive layer 9 corresponding to the transparent portions 10a of the photographic negative 10 are photo-set to produce set portions remaining as an insolubilized gelcoat which protects the colored polarizing film portions 7 previously formed thereunder. Those portions of the photosensitive layer 9 facing the opaque portions 10b of said photographic negative 10 are dissolved and removed to disclose the polarizing film blank 1 thereunder (FIG. 2E).

Thus, if the laminate 3 having the thus processed photosensitive layer 9 is colored by being immersed in a polarizing ink producing a color different from the color used previously and set portion of the photosensitive layer 9 is washed off with a suitable solvent, a polarizer 11 on which the polarizing film portions 7 and 7a having a different color from each other are alternatively disposed so as to form a two-color grating pattern can be obtained (FIG. 2F).

The foregoing description has handled a case in which a polarizer having two-color grating pattern is produced by using two photographic negatives 5 and 10 each having transparent and opaque portions which are disposed exactly opposite, respectively, to each other. In a similar manner, a multi-colored display polarizer having a desired pattern can be produced by selecting an appropriate number of photographic negatives on which letters, symbols, figures or the like patterns are formed and repeated, each time by using a different one of the thus selected photographic negatives, in the aforementioned sequence of operations.

Referring now to FIG. 3 illustrating another preferred embodiment of the process according to the present invention, the reference numeral 12 indicates a polarizer composed of a transparent substrate 13 on which polarizing film portions 14 with letter patterns such as S, M, . . . , Sa representing days of the week are formed in green color as shown at the upper part of FIG. 3A and a polarizing film 15 of gray color as shown at the lower part of FIG. 3A.

Figure 3B:
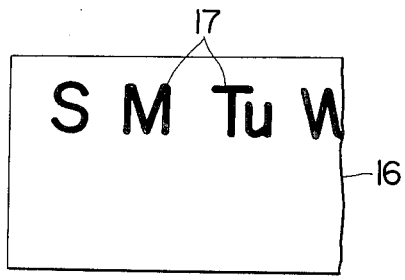
Figure 3C:
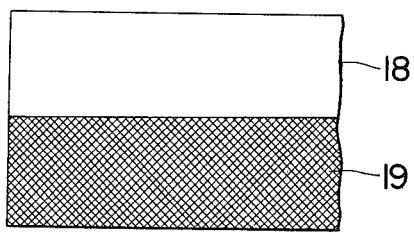

Such a polarizer 12 can be produced by using a first photographic negative 16 having opaque portions 17 representing letters such as S, M, . . . , etc. at positions as shown in the upper part of FIG. 3B and a second photographic negative 18 having a transparent portion at the upper half part thereof and an opaque portion 19 at the lower half part thereof as shown in FIG. 3C.

Figure 4:
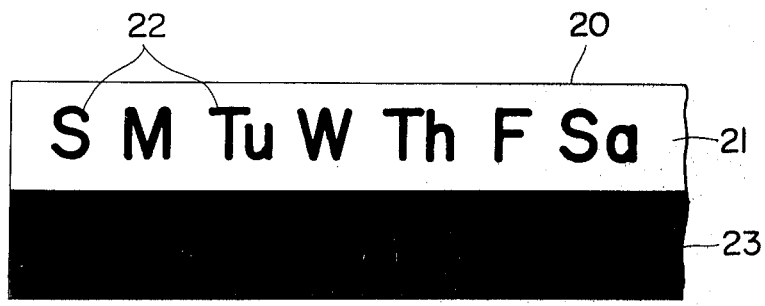
FIG. 4 is a schematic plan view for illustrating a further preferred embodiment of the process according to the present invention.

Further, as shown in FIG. 4, a polarizer which presents a monochromatic display of desired patterns can be obtained by using one single photographic negative 20 having an upper transparent portion 21 in which opaque portions 22 representing letters such as S, M, . . . , etc. or other patterns are formed and a lower opaque portion 23.

In the process according to the present invention as described hereinbefore, since the respective parts of the polarizing film blank 1 to be colored are definitely demarcated from each other by the use of the photosensitive layers 4 and 9 and the photographic negatives 5 and 10, a multi-colored display polarizer in which the polarizing film portions 7 and 7a colored in different colors are neither overlapped with each other nor spaced apart by a small gap from each other and, therefore, a definite color separation is ensured.

Also, according to the present invention, unlike the prior art polarizers in which separately prepared polarizing films or polarizer sections are applied onto a transparent substrate, since the colored polarizing film portions 7 and 7a are formed substantially integrally with the polarizing film bank 1, there is no possibility of said polarizing film portions 7 and 7a being exfoliated from the transparent substrate 2 and, thus, a stable polarizability can be maintained over a long period.

Further, according to the present invention, unlike the conventional polarizers in which polarizing film strips are stuck onto a transparent substrate or polarizing ink is transferred to a film blank of polymeric material, a multi-colored display polarizer having a pattern in which complicated figures and/or colors are combined can be easily produced, because any plurality of photosensitive layers and photographic negatives such as indicated at 4, 9 and 5, 10, respectively, in FIG. 2 can be used in a desired combination to form polarizing film portions colored in a different color from each other.

Apart from such multi-colored display polarizers, a monochromatic display polarizer having desired patterns such as letters, figures, symbols or the like corresponding to the photographic negative can be easily obtained as well by the process according to the present invention.

Hereinafter, the present invention will be described by way of specific examples of the preferred embodiments thereof.

EXAMPLE 1

In the manner as shown in FIG. 1B, onto the surface of a transparent substrate of triacetate film of $250\mu \sim 350\mu$ thick, a transparent polarizing film blank $18\mu \sim 25\mu$ obtained by orienting a polyvinyl alcohol film at a draw ratio of $2.5 \sim 3.5$ was optically applied, and the resultant laminate was cut into the size of $350 \times 400$ mm, and 5 g of photo-resist (E.P.P.R produced by Tokyo Ohka Co., Ltd.) was evenly coated onto the surface of the polarizing film blank 1 and dried to obtain a coating of $15\mu \sim 30\mu$ thick thereon. Then, a black-and-white photographic negative having a striped pattern was placed on the surface of said photosensitive coating in close contact therewith, and the thus treated laminate covered with said photographic negative was held between a pair of glass plates and exposed for $20 \sim 30$ seconds to a light emitted from a 3 KW high-pressure mercury vapor lamp placed at a fixed distance of about 30 cm apart therefrom. Then the thus exposed laminate was developed for 30~40 seconds in trichloroethylene vapor to disclose the original transparent polarizing film blank under the unexposed portion of the photosensitive coating, thus leaving the photosensitive coating at the exposed portions thereof. The thus developed laminate was immersed for 2~4 minutes in a dyestuff solution (at 25~30° C.) which was prepared beforehand by dissolving 1.6 g of Kayarus Red 4B (produced by Nippon Kayaku Co., Ltd.) and 1 g of Direct Brilliant Yellow G in 1 l of water, followed by rinsing and drying. Consequently, the aforesaid disclosed portions of the transparent polarizing film blank were colored in red. These red-colored portions appeared in a neutral reddish tinge when viewed through a polarizer of neutral color placed at a parallel position to said polarizing film blank, but appeared as a color band of thick reddish tinge when said polarizer was turned 90° to a position normal to said polarizing film blank. Then, the photo-set coating at the exposed portions of the photosensitive coating was cleaned off by using a thinner (predominantly composed of xylene) and the photoresist (aforesaid E.P.P.R) was again coated on said laminate, followed by drying. Thereafter, another black-and-white photographic negative having a complementary disposition of grating pattern to the first-cited photographic negative was placed thereon in close contact therewith, and the thus treated laminate covered with another photographic negative was held between a pair of glass plates and also exposed to a light emitted from a high-pressure mercury vapor lamp positioned as before, followed by a developing step in a trichloroethylene vapor. Consequently, the exposed photo-resist coating on said red-colored polarizing film portions was left on the laminate and the transparent polarizing film blank was disclosed at the unexposed portions of the photo-sensitive coating. Then, the thus developed laminate was immersed for 2~3 minutes in a dyestuff solution (at 25~30° C.) which was also prepared beforehand by dissolving 2 g of Direct Copper Blue 2B (produced by Nippon Kayaku Co., Ltd.) in 1 l of water, followed by rinsing and drying. Consequently, said disclosed portions of the transparent polarizing film blank were colored in blue, but the exposed portions were not colored and also cleaned off with a thinner. Thus, a polarizer having a two-colored grating pattern in which the red-colored and blue-colored bands are alternately disposed was obtained. Said two-colored pattern appeared as neutral reddish and bluish tinges when viewed through a polarizer of neutral color placed at the aforesaid parallel position and appeared as polarized color bands of thick red and blue when said polarizer was turned 90° to a position normal to said parallel position.

EXAMPLE 2

After evenly coating 5 g of photo-resist (said E.P.P.R) onto a polarizing film blank of a transparent laminate and drying the same in the same manner as the aforementioned Example 1, a photographic negative having thereon a black letter pattern was placed thereon in close contact therewith. Then, said laminate and photographic negative were held between a pair of glass plates and irradiated for 20~30 seconds by a light emitted from a high-pressure mercury vapor lamp, and the thus exposed laminate was developed under vibration for 20~30 seconds in ligroin (produced by Nippon Seiyu Co., Ltd.). Consequently, the photo-resist coating at the exposed portions was left on the laminate, but the transparent polarizing film blank was disposed at the unexposed portions of the photo-resist coating corresponding to the letter patterns of the photographic negative. After being rinsed and dried, the thus developed laminate was immersed for 2~4 minutes in a dyestuff solution which was prepared beforehand by dissolving 2 g of Kayarus Cupro Green (produced by Nippon Kayaku Co., Ltd.) in 1 l of water. Consequently, said disclosed portions corresponding to the letter patterns of the photographic negative were colored, and these colored portions appeared in a neutral greenish tinge when viewed through a polarizer of neutral color placed at the parallel position, while they appeared as letters having a polarized color of thick green when viewed at a position normal thereto. Thereafter, the photo-resist coating at the exposed portions were cleaned off by using chlorobenzene and the photo-resist liquid was again coated thereon, followed by drying. Then, another photographic negative having thereon transparent letter patterns on a black background in contrast to the first-cited photographic negative was placed on the photo-resist coating of the laminate, and the thus treated laminate was held between a pair of glass plates and irradiated by a light emitted from a high-pressure mercury vapor lamp in the manner as described previously. Thereafter, the thus exposed laminate was developed in ligroin, followed by rinsing and drying. Consequently, the exposed portions of the photo-resist coating corresponding to the letter patterns of the photographic negative were left, while the transparent polarizing film blank was disclosed at the remaining unexposed portions. Then, the thus developed laminate was immersed for 3~5 minutes in a dyestuff solution (at 25~30° C.) which was prepared beforehand by completely dissolving 2 g of Direct Fast Black D (produced by Nippon Kayaku Co., Ltd.) in 1 l of water, followed by rinsing and drying. As a result, only said disclosed polarizing film blank portions were colored. Thereafter, the photo-resist coating at the letter pattern portions was cleaned off by using chlorobenzene. Thus there was produced a two-colored polarizer having polarizable letter patterns which appear in a neutral color when viewed through a polarizer of neutral color placed at the parallel position and which show a polarizability to gray and, at the same time, a polarizability to green for letter portions only at a position normal to said parallel position.

EXAMPLE 3

After evenly coating a photo-resist (T.P.R produced by Tokyo Ohka Co., Ltd.) onto a polarizing film blank of a transparent laminate and drying the same in the same manner as Example 1, a photographic negative having opaque patterns of letters and a symbol X was placed thereon in close contact therewith, and the thus treated laminate was held between a pair of glass and exposed therethrough. Then, the thus exposed laminate was developed in Trichlene vapor, followed by rinsing. Then, the thus developed laminate was immersed for 1~2 minutes in a dyestuff solution which was prepared beforehand by dissolving 2 g of Kayarus Black ARX (produced by Nippon Kayaku Co., Ltd.) in 500 ml of water and 500 ml of ethyl alcohol, followed by rising and drying. Consequently, the portions of the polarizing film blank corresponding to the patterns of letters and symbol X of the photographic negative were colored in gray. After rinsing and drying, the photo-resist coating at the exposed portions was cleaned off by using benzyl alcohol to disclose the polarizing film blank. The resultant polarizer appeared in a neutral color when viewed through a polarizer of neutral color placed at its parallel position, while it showed polarized patterns of the letters and symbol X in a polarized blue-purple color when said polarizer of neutral color was turned 90° to said parallel position.

It is to be noted that, in the process according to the present invention, letters and color bands may be displayed in varied colors or only letter patterns may be partially polarized through a transparent member by using various combinations of photographic negatives and/or polarizing inks in the similar manner to those described hereinbefore. Alternatively, by repetitively forming a polarizable band of each color on one laminate, color bands of the same color equally spaced apart from one to another may be simultaneously produced on one polarizer, for example, such as one having a multi-colored equally-spaced striped pattern.

Also, by applying an additional substrate (triacetate, acetate butyrate cellulose, acrylic sheet, etc.) onto the polarizing film blank, a polarizer having an improved durability can be obtained. Further, by repeating several times the aforementioned sequence of operations by using a suitably different color and/or pattern each time in accordance with an intended design and die-cutting the resultant polarizer sheet to a predetermined size, a polarizer which can be used for a colorful display unit as being disposed on the front or rear side of the liquid crystal cell can be manufactured.

What is claimed is:

1. In a process for producing a polarizer comprising a film and a transparent support substrate, the improvement comprising the steps of coating a normally liquid photo-sensitive resin onto the surface of a polyvinyl alcohol film blank oriented in one direction and drying said coating; exposing said coated film blank to light through a first photographic negative to photo-set said photosensitive resin at portions thereof corresponding to transparent portions of said first negative; developing the thus exposed film blank by dissolving and removing the resin remaining on the unexposed portions of said coated film blank to reveal the film blank thereunder; causing ink containing iodine and a first dyestuff to be adsorbed into said oriented film blank at said revealed portions thereof; removing said photo-set resin from the exposed portions of said film blank by use of an organic solvent containing xylene; applying another coating of a photosensitive resin to the thus obtained film blank and drying said coating; exposing said obtained coated film blank to light through a second photographic negative having opaque portions corresponding to the transparent portions of said first photographic negative to photo-set said photosensitive resin at portions corresponding to the transparent portions of said second negative; developing the thus exposed film blank by dissolving and removing the resin remaining on the unexposed portions of said film blank to reveal the film blank thereunder; causing ink containing iodine and a second dyestuff to be adsorbed into said film blank at revealed portions thereof; and removing said photo-set resin from the exposed portions of said film blank, thereby producing a multi-colored display polariser.

2. A process according to claim 1, wherein said polarizing film blank has a thickness of from $18\mu$ to $25\mu$.

3. A process according to claim 1 or 2, wherein said photosensitive resin is water-soluble resins having a liquid state under normal conditions.

4. A process according to claim 3, wherein said water-soluble resins include dichromate type photoresists.

5. A process according to claim 4, wherein said dichromate type photoresists are obtained by blending a dichromate with a material selected from the group consisting of insinglass, casein, and polyvinyl alcohol (PVA).

6. A process according to claim 3, wherein said water-soluble resins include acrylic photo-resists.

7. A process according to claim 6, wherein said acrylic photo-resists are obtained by copolymerizing a vinyl monomer with methyl methacrylate.

8. A process according to claim 1 or 2, wherein said photosensitive resin is oil-soluble resins having a liquid state under normal conditions.

9. A process according to claim 8, wherein said oil-soluble resins include polyvinyl cinnamate type photoresists.

10. A process according to claim 9, wherein said polyvinyl cinnamate type photo-resists are obtained by blending a polyvinyl cinnamate with photosensitizers.

11. A process according to claim 8, wherein said oil-soluble resins include cyclized rubber-azide type photo-resists.

12. A process according to claim 11, wherein said cyclized rubber-azide type photo-resists are obtained by blending a cyclized rubber with an aromatic bisazide compound.

13. A process according to claim 12, wherein said aromatic bisazide compound includes 2,6-di(4'azidebenzal)-cyclohexanone, etc.

14. A process according to claim 1, wherein said removal of the resin on the unexposed portion of the coated film is performed by cleaning off said photo sensitive layer with an organic solvent.

15. A process according to claim 1, wherein said dyestuff includes a member selected from the group consisting of acid dye and direct dye.

* * * * *